(12) United States Patent
Frahim et al.

(10) Patent No.: US 11,411,957 B2
(45) Date of Patent: *Aug. 9, 2022

(54) BROKER-COORDINATED SELECTIVE SHARING OF DATA

(71) Applicant: Cisco Technology, Inc., San Jose, CA (US)

(72) Inventors: Jazib Frahim, Cary, NC (US); Haseeb Sarwar Niazi, Cary, NC (US); Hazim Hashim Dahir, Raleigh, NC (US); Aamer Saeed Akhter, Cary, NC (US); Nancy Cam-Winget, Mountain View, CA (US); Aun Raza, Dubai (AE)

(73) Assignee: Cisco Technology, Inc., San Jose, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/895,548

(22) Filed: Jun. 8, 2020

(65) Prior Publication Data

US 2020/0304506 A1 Sep. 24, 2020

Related U.S. Application Data

(63) Continuation of application No. 15/498,192, filed on Apr. 26, 2017, now Pat. No. 10,693,878.

(51) Int. Cl.
*H04L 9/40* (2022.01)

(52) U.S. Cl.
CPC ........ *H04L 63/101* (2013.01); *H04L 63/0281* (2013.01); *H04L 63/0428* (2013.01); *H04L 63/102* (2013.01); *H04L 63/20* (2013.01)

(58) Field of Classification Search
CPC ... H04L 63/101; H04L 63/0428; H04L 63/20; H04L 2209/603; G06Q 20/1235
See application file for complete search history.

(56) References Cited

U.S. PATENT DOCUMENTS

| 6,732,179 B1 * | 5/2004 | Brown ................... G06F 21/10 709/225 |
| 2006/0235973 A1 * | 10/2006 | McBride ................. H04L 63/10 709/226 |

(Continued)

FOREIGN PATENT DOCUMENTS

| KR | 20160099256 A | 8/2016 |
| WO | WO-2016138067 A1 | 9/2016 |

*Primary Examiner* — Alexander Lagor
*Assistant Examiner* — William B Jones
(74) *Attorney, Agent, or Firm* — Behmke Innovation Group LLC; James M. Behmke; Jonathon P. Western (57) ABSTRACT

In one embodiment, a gateway device receives, from a centralized broker device, a data-access policy for a given computer network, the data-access policy defining which of one or more accessing entities are granted access to specific elements of data within the given computer network. When the gateway device then receives, from a particular accessing entity, a request for one or more particular elements of data from within the given computer network, it may determine, based on the data-access policy, whether the particular accessing entity has been granted access to each of the one or more particular elements of data of the request. As such, the gateway device may prevent access for the particular accessing entity to any of the one or more particular elements of the data request to which the particular accessing entity has not been granted access.

20 Claims, 10 Drawing Sheets

(56) References Cited

U.S. PATENT DOCUMENTS

| | | |
|---|---|---|
| 2011/0047381 A1 | 2/2011 | Ganesan et al. |
| 2011/0093913 A1 | 4/2011 | Wohlert et al. |
| 2016/0128043 A1 | 5/2016 | Shuman et al. |
| 2016/0344740 A1 | 11/2016 | Choi |
| 2016/0366183 A1* | 12/2016 | Smith .................... H04L 63/06 |
| 2017/0353516 A1 | 12/2017 | Gordon |
| 2018/0167808 A1 | 6/2018 | Somaraju et al. |
| 2018/0255099 A1 | 9/2018 | Chen et al. |

* cited by examiner

| GATEWAY 330 605 | PUBLIC IP 610 | COLLECTOR IP 615 | SUPPORTED ENCRYPTION 620 | TTL 625 |
|---|---|---|---|---|
| VENDOR 1 | 1.1.1.1 | 10.1.1.1 | AES-256 | 3600 s |
| VENDOR 2 | 1.1.1.2 | 10.2.1.1 | AES-128 + | 1800 s |
| VENDOR 3 | 1.1.1.3 | 10.3.1.1 | AES-128 + | 60 s |
| VENDOR 4 | 1.1.1.4 | 10.4.1.1 | AES-256 | 120 s |

BROKER-COORDINATED SELECTIVE SHARING OF DATA

CROSS-REFERENCE TO RELATED APPLICATION

This application is a Continuation Application of U.S. patent application Ser. No. 15/498,192, filed Apr. 26, 2017, entitled BROKER-COORDINATED SELECTIVE SHARING OF DATA, by Jazib Frahim, et al., the contents of which are incorporated herein by reference.

TECHNICAL FIELD

The present disclosure relates generally to computer networks, and, more particularly, to broker-coordinated selective sharing of data.

BACKGROUND

Many computer networks, particularly "Internet of Things" (IoT) networks (e.g., industrial automation and control systems (IACS) networks), are typically composed of a plethora of IoT devices, mainly from different manufacturers. Multiple parties/vendors are often engaged to collect data from the IoT devices for their health and welfare, while some others collect data and/or perform analytics to detect anomalies and predict device/part failures. Access control on the data is thus paramount, given the many different entities that may attempt to retrieve such data.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a gateway device receives, from a centralized broker device, a data-access policy for a given computer network, the data-access policy defining which of one or more accessing entities are granted access to specific elements of data within the given computer network. When the gateway device then receives, from a particular accessing entity, a request for one or more particular elements of data from within the given computer network, it may determine, based on the data-access policy, whether the particular accessing entity has been granted access to each of the one or more particular elements of data of the request. As such, the gateway device may prevent access for the particular accessing entity to any of the one or more particular elements of the data request to which the particular accessing entity has not been granted access.

According to one or more embodiments of the disclosure, a centralized broker device determines a plurality of elements of data within a given computer network, and receives configuration for a data-access policy for the given computer network. By transmitting the data-access policy for the given computer network to a gateway device, the centralized broker device thus causes, based on the data-access policy, the gateway device to determine whether a particular accessing entity has been granted access to each of the one or more particular elements of data of a request based on the data-access policy, and to prevent access for the particular accessing entity to any of the one or more particular elements of the data request to which the particular accessing entity has not been granted access.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1:
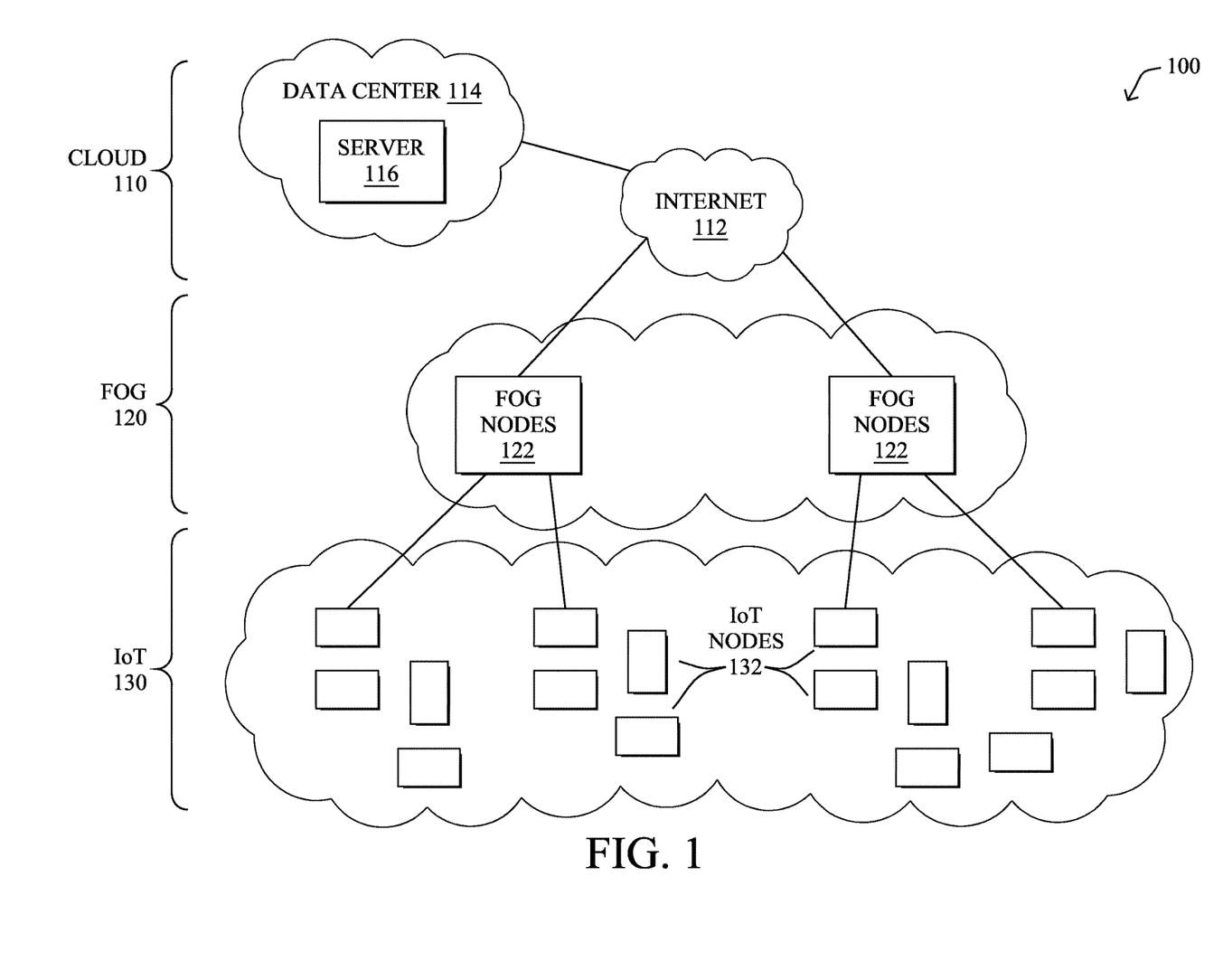
FIG. 1 illustrates an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
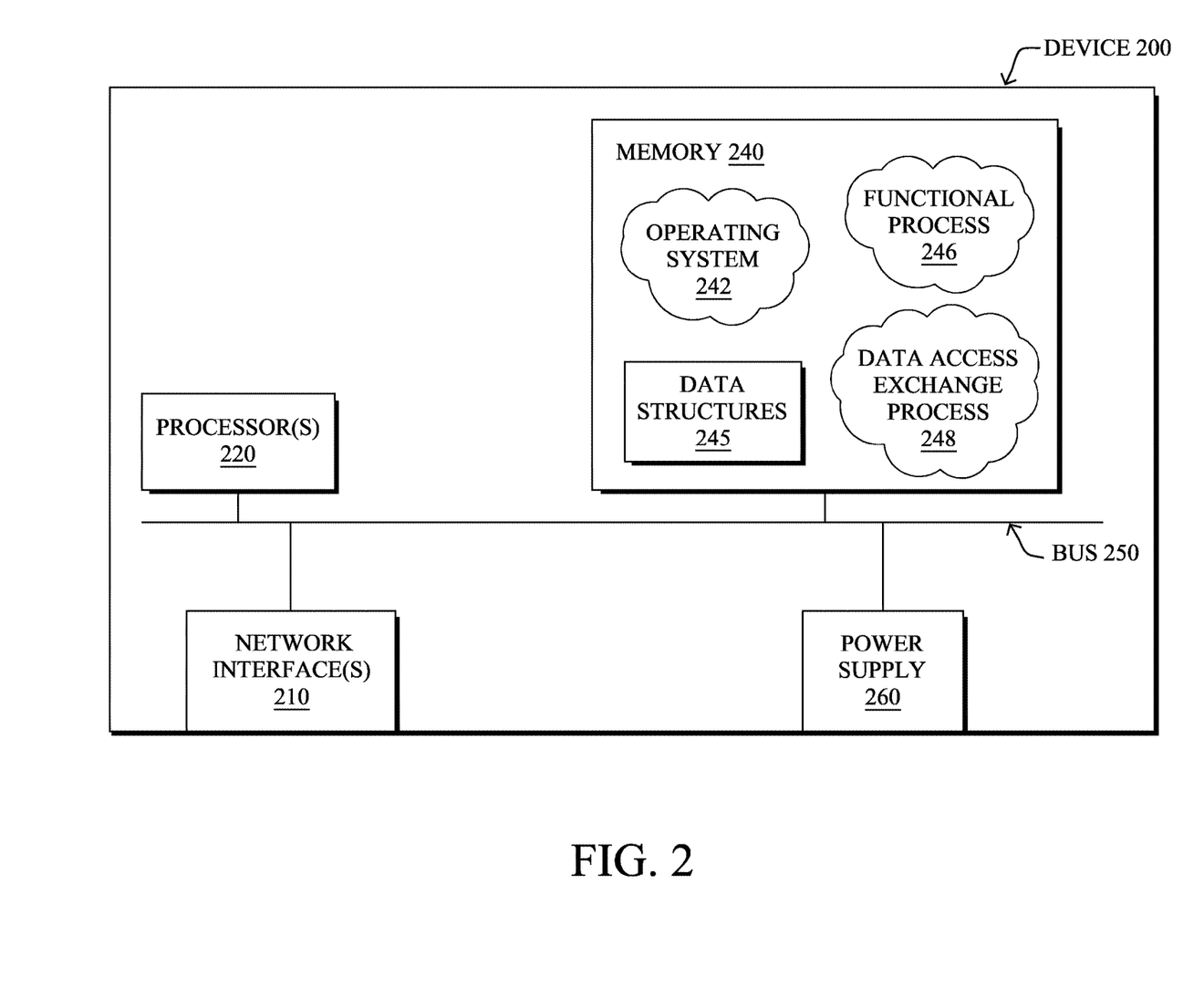
FIG. 2 illustrates an example computing device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, cellular, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, cellular transceivers, WiFi transceivers, or the like, to allow device 200 to communicate information to and from a remote computing device or server. Note, further, that the nodes may have two different types of network connections 210, e.g., wireless and wired/physical connections, and that the view herein is merely for illustration. Also, while the network interface 210 is shown separately from power supply 260, for devices using powerline communication (PLC), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "data access exchange" process 248, as described herein. Notably, functional processes 246, when executed by processor(s) 220, cause each particular device 200 to perform the various functions corresponding to the particular device's purpose and general configuration. For example, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Broker-Coordinated Selective Sharing of Data

As mentioned above, many computer networks (e.g., IoT networks), such as industrial automation and control systems (IACS) networks, are typically composed of a many different kinds of devices, which may be provided by many different device manufacturers. Because of this, there are often multiple entities that are engaged to collect data from the devices, such as for their health and welfare or other status or statistics. For example, data may be collected and analytics may be performed in order to detect anomalies and predict device/part failures.

The techniques herein address when a manufacturer (or enterprise or other network) wants to apply appropriate access controls on its data to make sure that a data accessor (e.g., a partner) is only retrieving authorized data from the system when data extraction calls are made. Current techniques merely assist in the brokerage of identity information and standard authorization-based access to information (e.g., "all or nothing"), and many techniques alternatively involve storing the secure data in the cloud, and then sharing data from the cloud broker with multiple partners. However, the techniques herein focus on properly distributing particular authorized portions of data directly between the data owners (device owners) and appropriate data accessors (accessing entities), without transmitting the data through a broker, illustratively establishing a partnership ecosystem.

In particular, the techniques herein build an exchange that allows for secure connections to be dynamically built between trusted partners seamlessly, providing authorization controls on a per data element basis between trusted parties. For instance, inline inspections may be made by corresponding network gateways (via secure connection), and sanitization of API queries may be accomplished per configured policy.

Specifically, according to one or more embodiments of the disclosure as described in detail below, a gateway device receives, from a centralized broker device, a data-access policy for a given computer network, the data-access policy defining which of one or more accessing entities are granted access to specific elements of data within the given computer network. When the gateway device then receives, from a particular accessing entity, a request for one or more particular elements of data from within the given computer network, it may determine, based on the data-access policy, whether the particular accessing entity has been granted access to each of the one or more particular elements of data of the request. As such, the gateway device may prevent access (e.g., incoming or outgoing access) for the particular accessing entity to any of the one or more particular elements of the data request to which the particular accessing entity has not been granted access.

Illustratively, the techniques described herein may be performed by hardware, software, and/or firmware, such as in accordance with the data access exchange process 248, which may include computer executable instructions executed by the processor 220 to perform functions relating to the techniques described herein, e.g., in conjunction with corresponding processes of other devices in the computer network as described herein.

Figure 3:
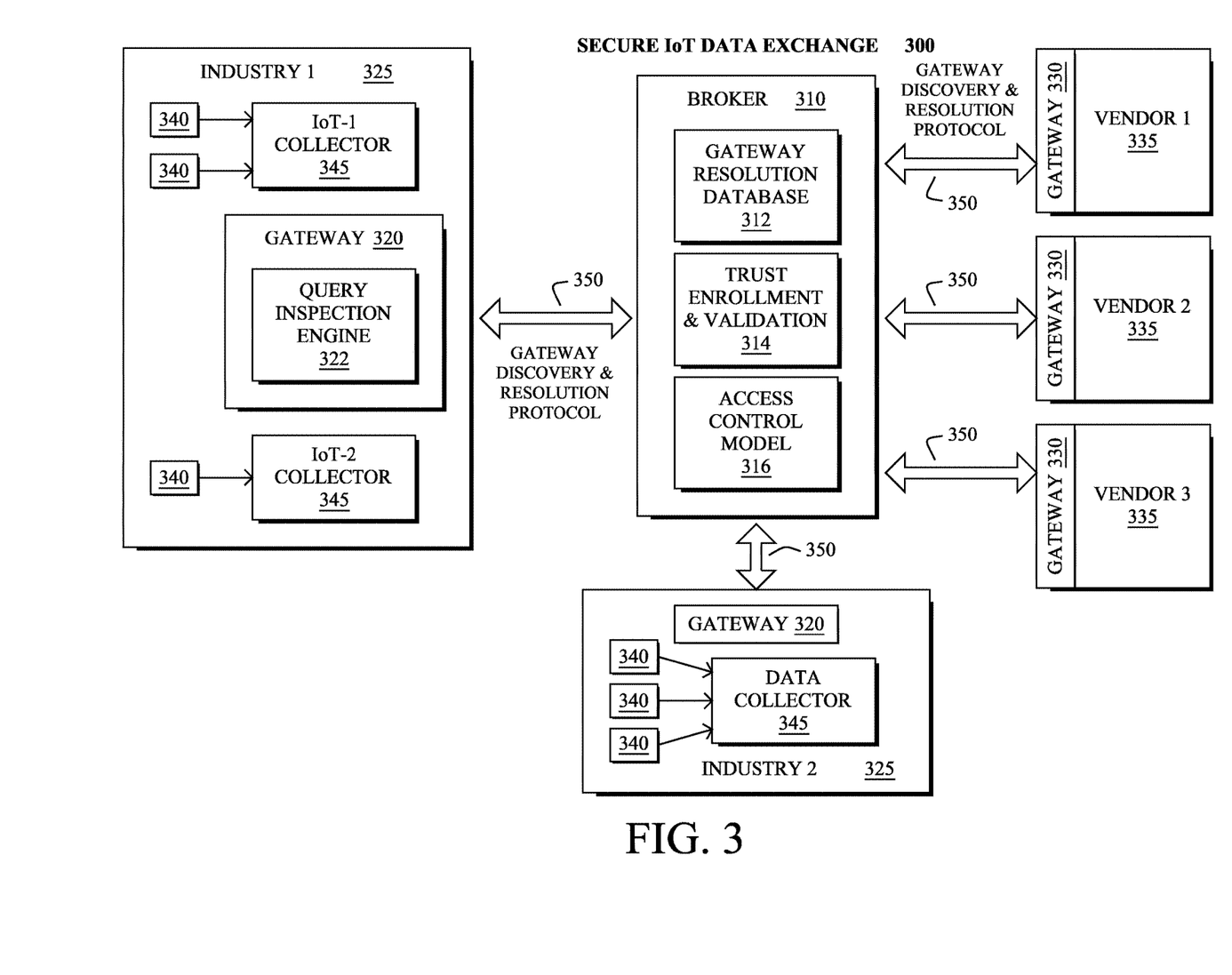
FIG. 3 illustrates an example infrastructure for secure data exchange.

Operationally, the techniques herein allow data to be selectively shared with other parties that are part of a partner/vendor ecosystem spanning multiple network domains. With reference to FIG. 3, an example infrastructure 300 for secure data exchange may comprise the following components:

1. Broker 310: Illustratively, a cloud data exchange and brokerage service is responsible for enrolling organizations (network domains), building and distributing access-control models, distributing keys for securing communication channels and resolving partner connections, as described below. Broker 310 may have one or more data structures (e.g., 245) or specifically configured processes (e.g., components of the illustrative "data access exchange" process 248), such as gateway resolution database 312, trust enrollment and validation process 314, and an access control model (e.g., policy) 316, as described herein.

2. Gateways 320 and 330: Illustratively, a gateway is a virtual or physical component of the architecture that acts as a middleware between the broker 310 and network domains, such as data source domains 325 ("ingress" gateway 320) or data accessing domains 335 ("egress" gateway 330). Within the data source domains 325, in particular, are data sources 340 (e.g., IoT devices, such as sensors as well as actuators), which may provide their data through one or more customer-owned data collectors 345, according to access control by gateway 320, as described herein. Gateways 330, on the other hand, are responsible for requesting data access for their respective network domain 335. Both ingress and egress gateways are also responsible for discovering partner connections. (Note that an ingress gateway may also be an egress gateway in certain specific configurations of the infrastructure 300, and their specific nomenclature used herein is merely for functional illustration.)

3. Gateway Discovery and Resolution Protocol 350: Illustratively, protocol 350 is responsible for registering and resolving partner's addresses, and distributing a dynamically-created shared secret between the connection requester and connection responder.

4. Query Inspection Engine 322: This module within the ingress gateways 320 (e.g., a component of the illustrative data access exchange process 248 on gateway devices) illustratively inspects application programming interface (API) calls for attributes (data elements) and allows only the authorized requests to pass through, as described herein.

According to the techniques herein, the broker 310 allows authorized gateways to establish communication in order to register their reachability attributes (such as public IP address, unique device ID, etc.), and register discovered services (such as the address of collectors, discovered IoT devices and their capabilities to name a few). When a new organization (or domain) wants to be a part of this brokerage, a gateway (e.g., a virtual or physical system, or a software module within a domain's edge router, etc.) is deployed at the perimeter of the new organization. The gateways are illustratively preconfigured with the appropriate identity attributes to auto-connect with the exchange and authenticate through an illustrative "trust enrollment and validation" process 314. The ingress gateways 320 are also programmed to connect with data-collectors 345, allowing the gateways to discover all the internally deployed devices (e.g., IoT devices) 340. Note that the gateways can optionally connect to an existing "Asset Discovery" service to learn about all the pre-discovered IoT devices, as may be readily appreciated by those skilled in the art.

As an example for illustration of the techniques herein, assume a scenario where a large manufacturer (industry 1, e.g., an automotive manufacturer) leverages IoT devices from multiple vendors 1-3 (e.g., various sensors, robotic machines, other assembly-line technologies, and so on). Gateways 320 are deployed at industry 1 (which, notably, may span multiple physical locations), and gateways 330 are deployed at vendors 1-3. All of the gateways may be connected to the exchange broker 310, as described above. Also, assume that as mentioned above, the IoT devices 340 have been dynamically discovered, with their attributes (including accessible elements of data) pushed to the exchange broker 310 for the creation of access-control policies, as described herein.

The following steps illustrate an example process of the broker-coordinated selective sharing of data according to one or more embodiments of the techniques herein.

First, an administrator from the data-owning organization (industry 1 in this example) connects to a portal of broker 310, such as through a secure login and/or from a pre-authorized device.

Figure 4:
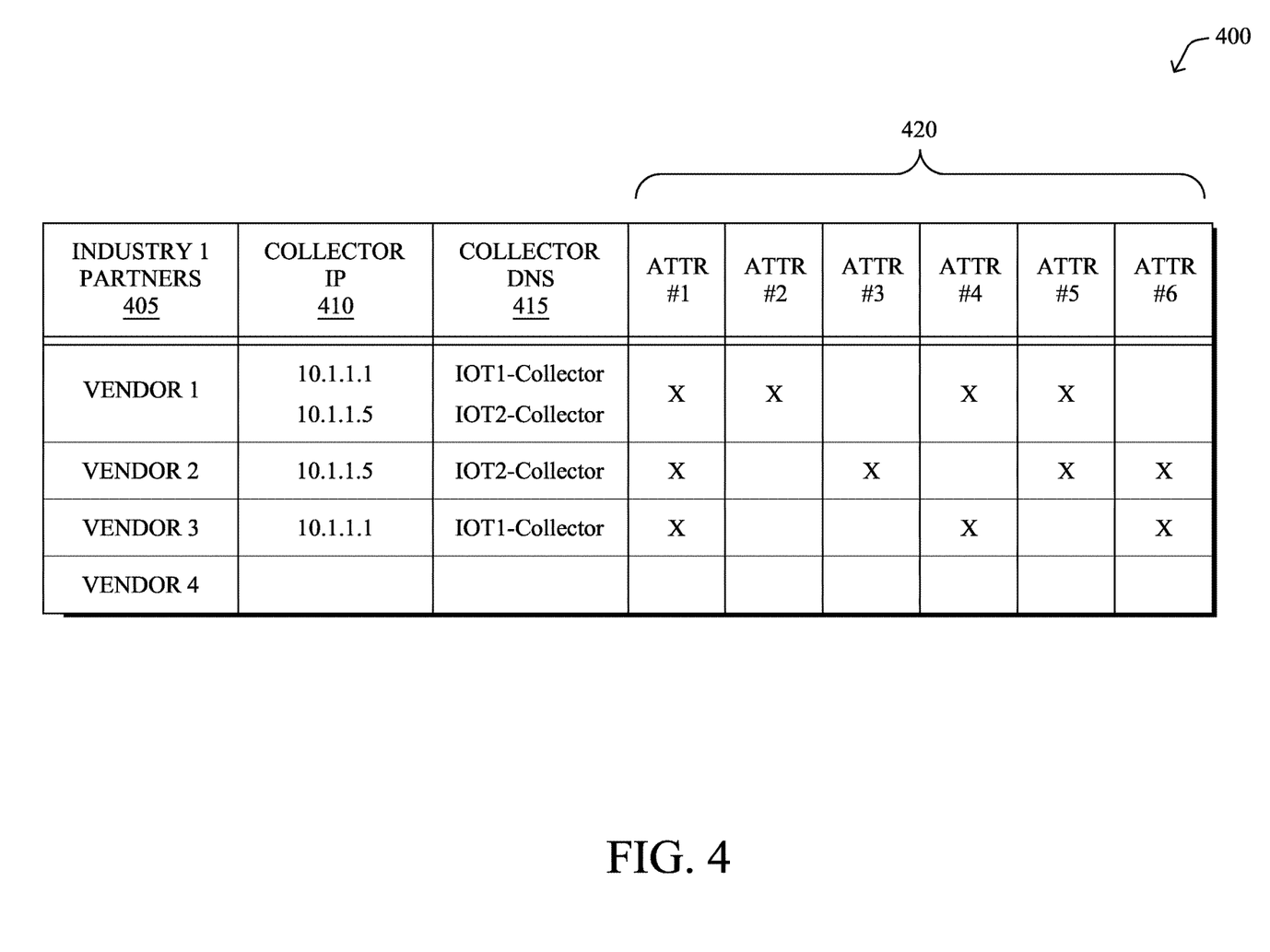
FIG. 4 illustrates an example data-access policy table.

Once logged in, the administrator can define a respective data-access policy (access control model 316). A more detailed example of model 316 is shown in FIG. 4, where a data-access policy (e.g., table) 400 can be configured to allow an organization to grant access to specific attributes (elements) of data 420 to each partner (e.g., vendors) 405 in this ecosystem. For example, industry 1 may allow vendor 1 to have access to attributes 1, 2, 4, and 5, may allow vendor 2 to have access to attributes 1, 3, 5, and 6, and may allow vendor 3 to have access to attributes 1, 4, and 6 only. Note that industry 1 may not have a trust relationship with vendor 4, which may or may not be explicitly shown in the table 400. Note further that attributes can also define a context by which access may be granted. For instance, attributes can consist of resources (e.g., devices, applications, combinations thereof, etc.) at particular locations (e.g., geophysical or logical groupings), as well as other contexts (e.g., temperatures only during alarm conditions, error codes only in multi-error conditions, and so on).

The policy table 400 also allows industry 1 to assign an appropriate collector 410 (e.g., an IP address) where the respective partner can request the authorized data access (e.g., a first collector IoT-1 or second collector IoT-2). The domain name service (DNS) name 415 will help to pick the right collector when API requests are made by a device in the partner's network.

The access-control policies 400 will be pushed to the appropriate gateways (320 and/or 330) in order to inspect the incoming API requests. This is the function of Query Inspection Engine 322 (notably on gateways 330 as well as 320, in one or more embodiments herein). For example, the exchange broker 310 pushes the vendor 1 specific policy for industry 1 (and all its partners) to the vendor 1 gateway 330 when it needs to send a request to industry 1's data collector 345. Similarly, the exchange broker 310 also pushes all policies to industry 1's gateways 320 that are relevant to industry 1 (e.g., and its partners). That is, the techniques herein may be configured to push the policy database 400 to at least two gateways (ingress and egress gateways, e.g., industry 1 and vendor 1) so that APIs are inspected twice (once at vendor 1's egress gateway before it traverses the secure connection, and once more at industry 1's ingress gateway before it is allowed to connect to the data collector 345). This double verification of authorized attributes is important to validate the integrity of the gateways and the exchange.

Figure 5:
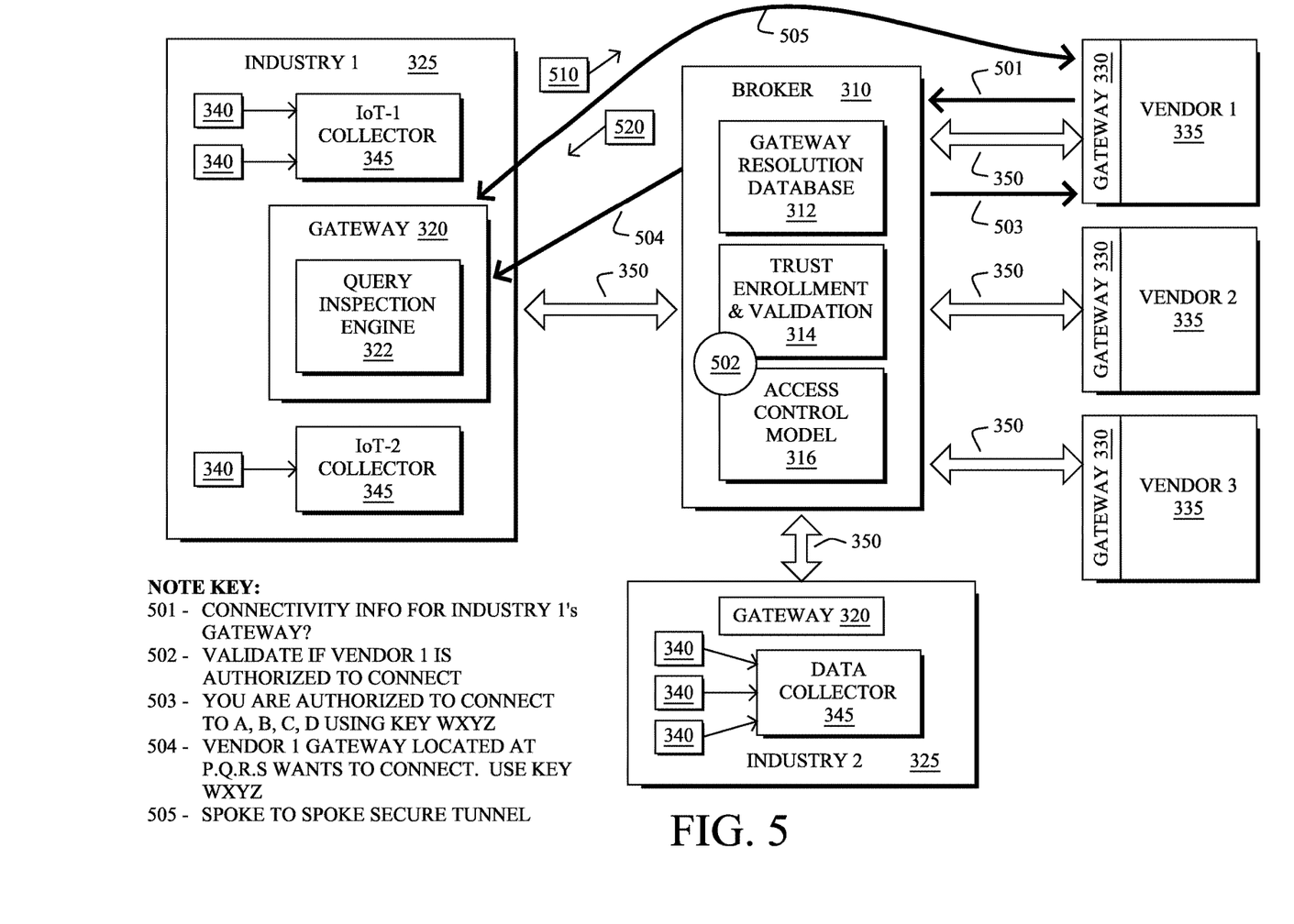
FIG. 5 illustrates an example of broker-coordinated selective sharing of data.
Figure 6:
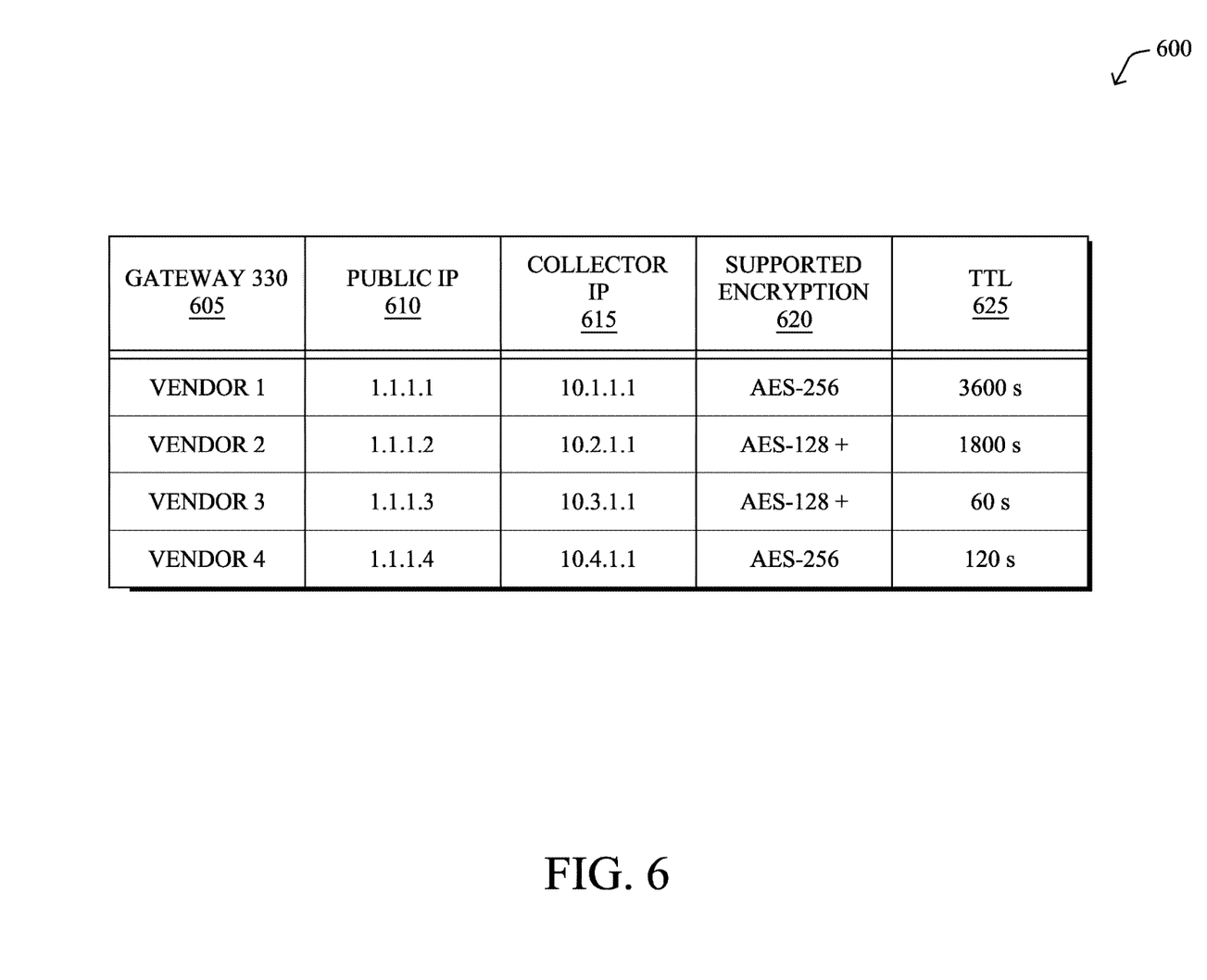
FIG. 6 illustrates an example registration and resolution table.

At this time, and with reference generally to FIG. 5, the gateway 330 at vendor 1 does not know where to connect to when it needs data to be retrieved from industry 1's collector. To determine the connectivity parameters, the gateway 330 may send a Resolution Request (501) to the exchange 310 for industry 1's gateway 320. If vendor 1 is allowed to communicate with industry 1 (determination 502 according to the access control model/policy 400), the exchange broker 310 will send Resolution Response 503 containing the gateway address for industry 1 (e.g., "a.b.c.d.") and a dynamically-generated shared secret for establishing a direct secure connection (e.g., key "wxyz"). Illustratively, the table 600 shown in FIG. 6 shows an example of a registration and resolution table, where egress gateways (data accessing gateways) 330 (table entry 605) are associated with a public IP address 610 and a local data collector 615. The exchange broker 310 may send, in message 504 of FIG. 5, a randomly generated shared secret to industry 1 along with the gateway address of vendor 1 (e.g., "p.q.r.s") and the encryption method 620 (to meet the industry or legal compliance) so industry 1 knows who to authenticate and how to verify the identity. The exchange broker in its response 504 may also include a Time-to-Live (TTL) value 625 so both gateways can flush out their entries (encryption keys, API relationship table, etc.) after the TTL expires. Note that PKI certificates, or other secure encryption techniques, can also be used instead of pre-shared key for identity verification.

Now that both gateways have enough information, vendor 1's gateway 330 may initiate a secure connection 505 to industry 1's gateway 320. As the new API requests 510 are made, the initiator's gateway (vendor 1) may be configured to inspect and monitor all queries in real-time to ensure compliance. The authorized requests use the newly-established secure channel 505 to communicate with the data collectors 345.

Similarly, the receiving gateway 320 inspects all the incoming API requests 510, leveraging Query Inspection Engine 322. The engine may apply an AND operator between the incoming data queries and the authorized access policy 400 of the partner initiating the request. Assume, for example, that the incoming request 510 from vendor 1 requests attributes 1 through 6.

If the Query Inspection Engine 322 determines that the other gateway 330 (sender) is requesting attributes that are not allowed by the configured policy, the receiving gateway 320 can generate an alert to the exchange broker 310 and the sender gateway, e.g., for resynchronizing the policy. After a resynchronization, if the receiver gateway continues to get API requests (e.g., up to three or some other threshold) for unauthorized attributes, it can blacklist (e.g., block, filter, report, etc.) the partner gateway until the issue is addressed.

Figure 7A:
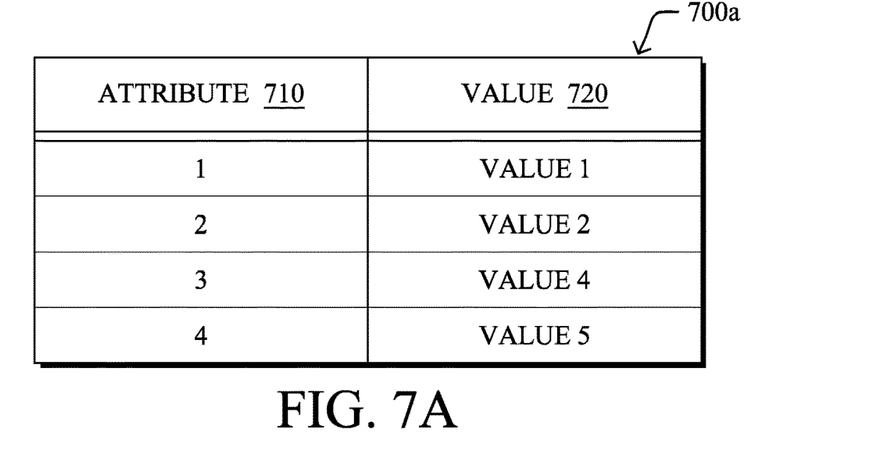
FIGS. 7A-7C illustrate examples of messages with selectively shared data.
Figure 7B:
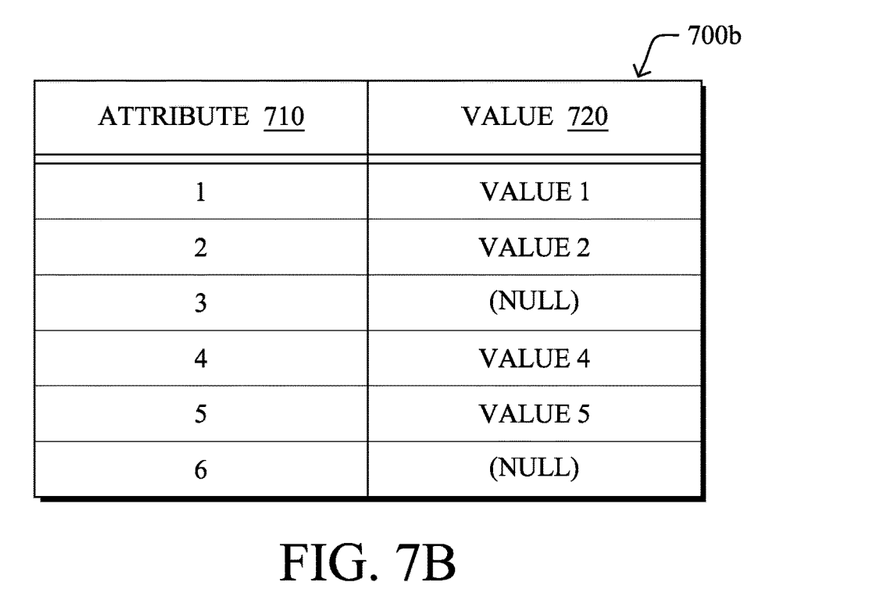
Figure 7C:
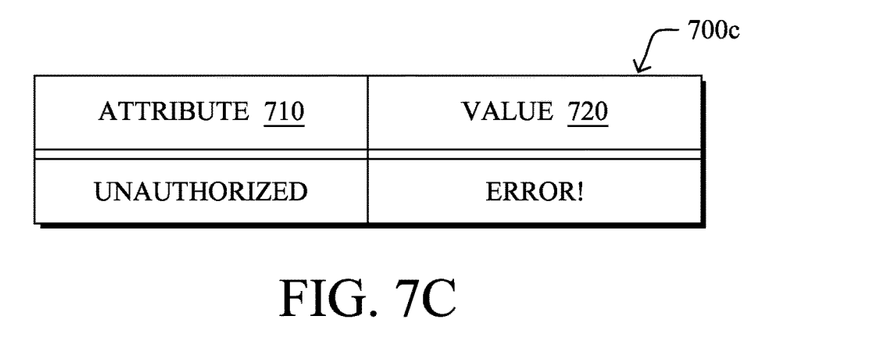

Once the data is pulled out of the collector based on the query engine's query, the response 520 to the original query 510 from the partner can illustratively be in a "strict" or "loose" mode. In loose mode, the original query may be rebuilt based on the cached information and based on the result it receives from the data collector. For the authorized attributes, the information is relayed to the partner. For the unauthorized access to attributes (e.g., 3 and 6 in the example), the gateway 320 may simply sends null (or annotations within the response highlighting filtered attribute) information. For the strict mode, the gateway 320 does not provide data response to any attributes (authorized or unauthorized). The API response may contain a message to re-issue the query for authorized attributes only. FIGS. 7A-7C illustrate simplified example responses 700a-c (respectively) for attributes 710 and their values 720 (or annotations), such as response 700a of FIG. 7A containing only authorized attributes, response 700b of FIG. 7B containing all requested attributes with annotations for unauthorized attributes, and response 700c of FIG. 7C illustrating a complete denial response (e.g., error message).

Note that as the connection times out (TTL value above), both gateways may be configured to purge their old information, as described above.

According to the techniques described herein, therefore, implements a system that allows organizations to build an access-control model based on the trust and relationship they have with others in the partner ecosystem. The trust may even be expanded to include role-based policy enforcement where administrators from a partner organization may have certain access to data elements while the users of the analytics platforms (from the same partner) may only get a limited view (subset of administrators) based on their data access requirements.

Figure 8:
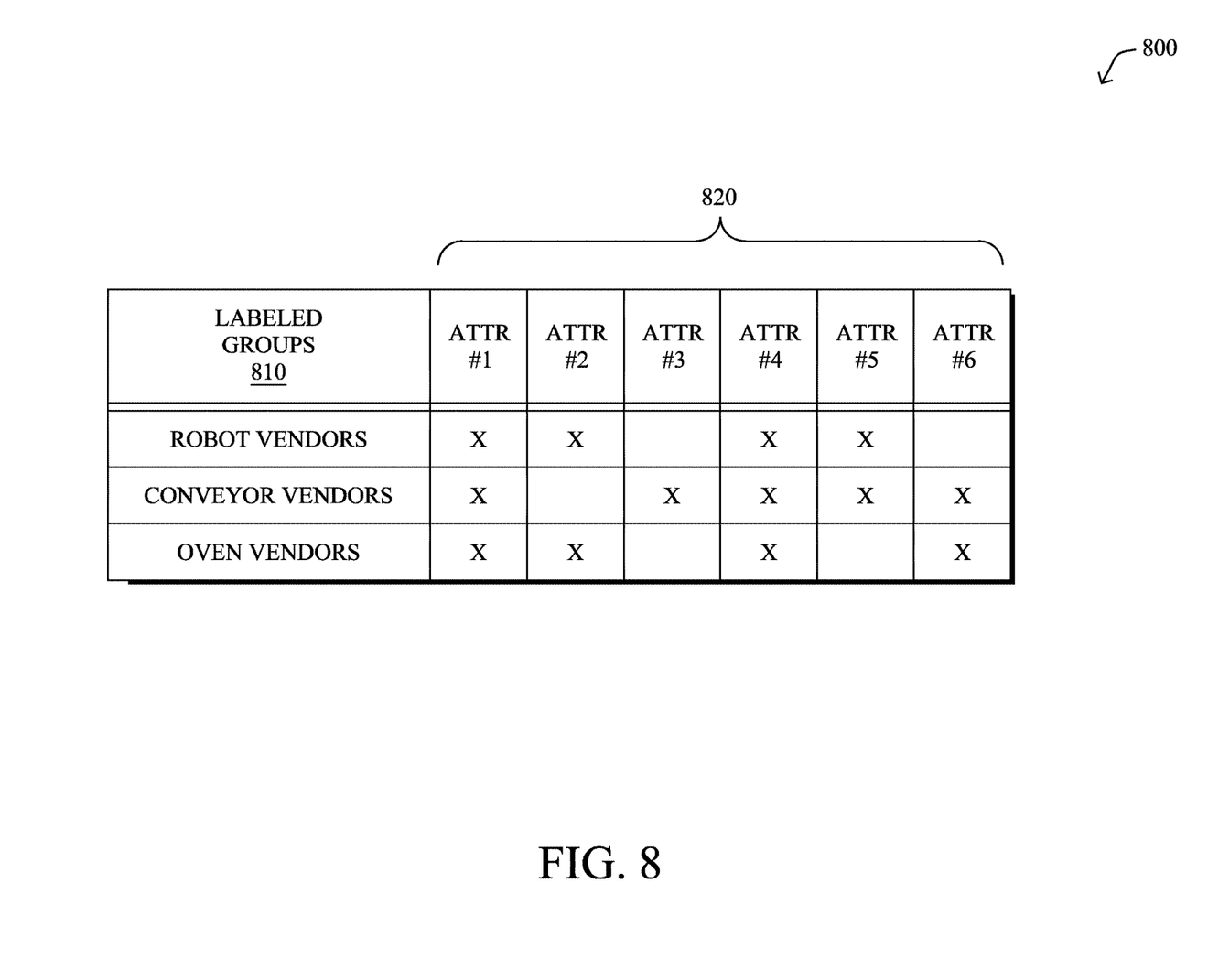
FIG. 8 illustrates an example of aggregating accessing entities into groups.

Further scale advantages can be achieved by aggregating partners into labeled groups. For instance, instead of expressing the access in terms of organizations (e.g., vendor 1, vendor 2, etc.), it can be expressed by assigning labels for groups. For example, a partner-group called "Robot-Vendors" could be created by an administrator of industry 2. Once a partner is qualified as a "Robot-Vendor", it can then have access to a set of attributes as a part of its standard view, such as shown in policy table 800 of FIG. 8 (with labelled groups 810 and attribute policy entries 820). In this manner, an administrator can build many different views and assign organizations (partners) into one or more views. The query engine may thus build a unique view for each organization based on its group membership and the attributes they should have access to.

Figure 9:
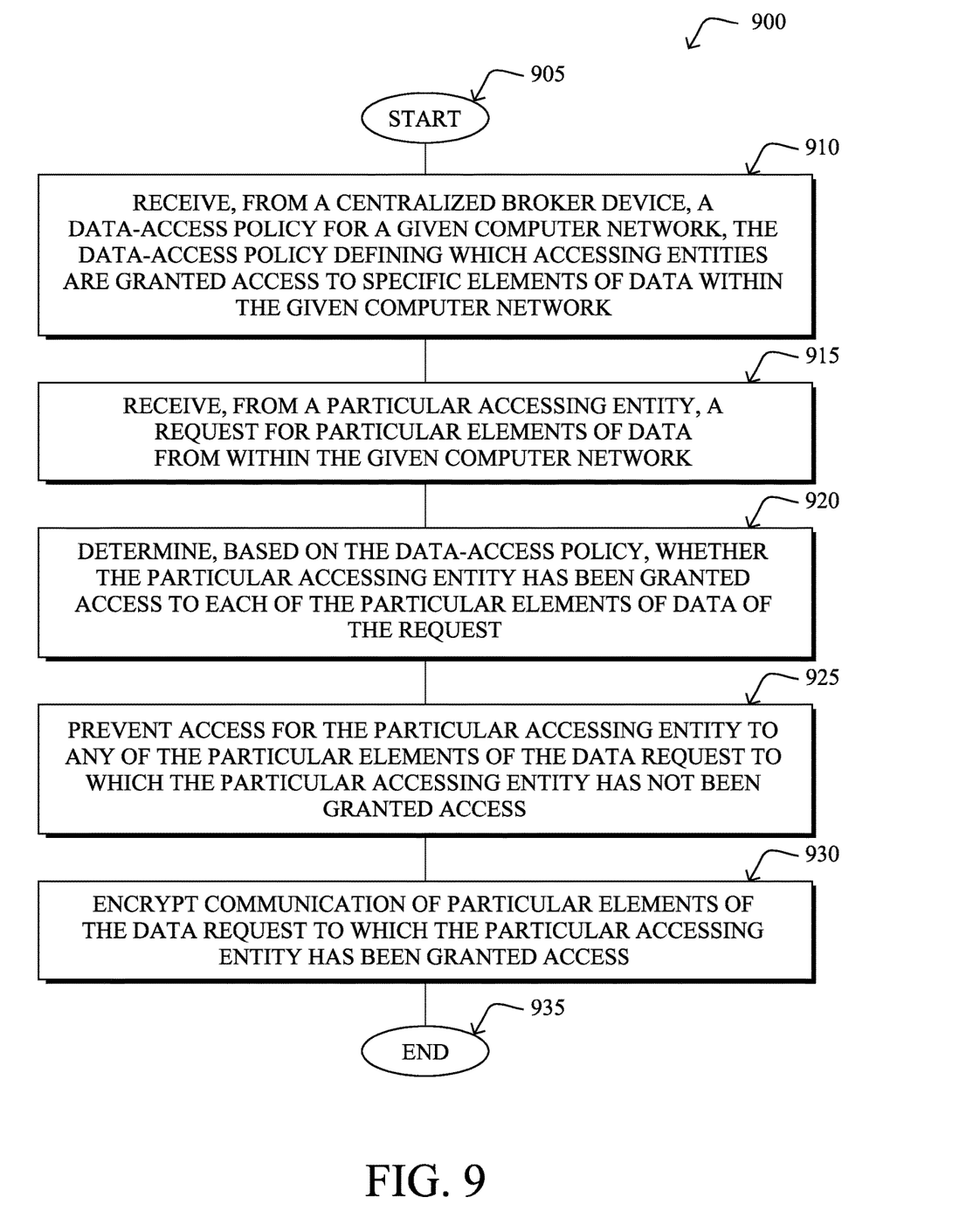
FIG. 9 illustrates an example simplified procedure for broker-coordinated selective sharing of data in a network, particularly from the perspective of a gateway.

FIG. 9 illustrates an example simplified procedure for broker-coordinated selective sharing of data in a network in accordance with one or more embodiments described herein, particularly from the perspective of the gateways 320 or 330. For example, a non-generic, specifically configured device (e.g., device 200 as a gateway) may perform procedure 900 by executing stored instructions (e.g., process 248). The procedure 900 may start at step 905, and continues to step 910, where, as described in greater detail above, a gateway device 320/330 receives, from a centralized broker device 310, a data-access policy 400 for a given computer network 325, the data-access policy defining which of one or more accessing entities are granted access to specific elements of data within the given computer network. As such, in step 915, the gateway device may receive, from a particular accessing entity, a request for one or more particular elements of data from within the given computer network. For example, an egress gateway 330 may receive a request 510 from accessing entities such as workstations, applications, processes, etc. within its domain 335. Alternatively, ingress gateway 320 may receive a request from the egress gateway 330, accordingly.

As described above, the gateway may first determine a particular collector of the given computer network to receive requests for the one or more particular elements of data, such as referencing the particular collector by DNS name for use by the API requests.

In step 920, the gateway device may determine, based on the data-access policy 400, whether the particular accessing entity has been granted access to each of the one or more particular elements of data of the request. If not, then in step 925, the gateway device prevents access for the particular accessing entity to any of the one or more particular elements of the data request to which the particular accessing entity has not been granted access. For instance, when the gateway device is for the given computer network (gateway 320), then preventing comprises preventing incoming requests into the given computer network. Alternatively, when the gateway device is for a remote computer network (gateway 330) to the given computer network, then preventing comprises preventing outgoing requests from the remote computer network toward the given computer network.

In step 930, the gateway may encrypt communication (responses 520) of one or more particular elements of the data request to which the particular accessing entity has been granted access (e.g., where encryption comprises a shared encryption secret having a TTL to expiration). Note that as described above, steps 925-930 may comprise either allowing access to only those of the one or more particular elements of the data request to which the particular accessing entity has been granted access (e.g., responses 700a or 700b), or else may comprise preventing access to all of the one or more particular elements of the data request in response to the particular accessing entity having not been granted access to any of the one or more particular elements of the data request (e.g., error response 700c). In either instance of preventing access, the gateway may dispatch an alert in response to prevented access, as mentioned above.

The illustrative simplified procedure 900 may then end in step 935, notably with the option to receive updated policies 400, further requests 510, and so on.

Figure 10:
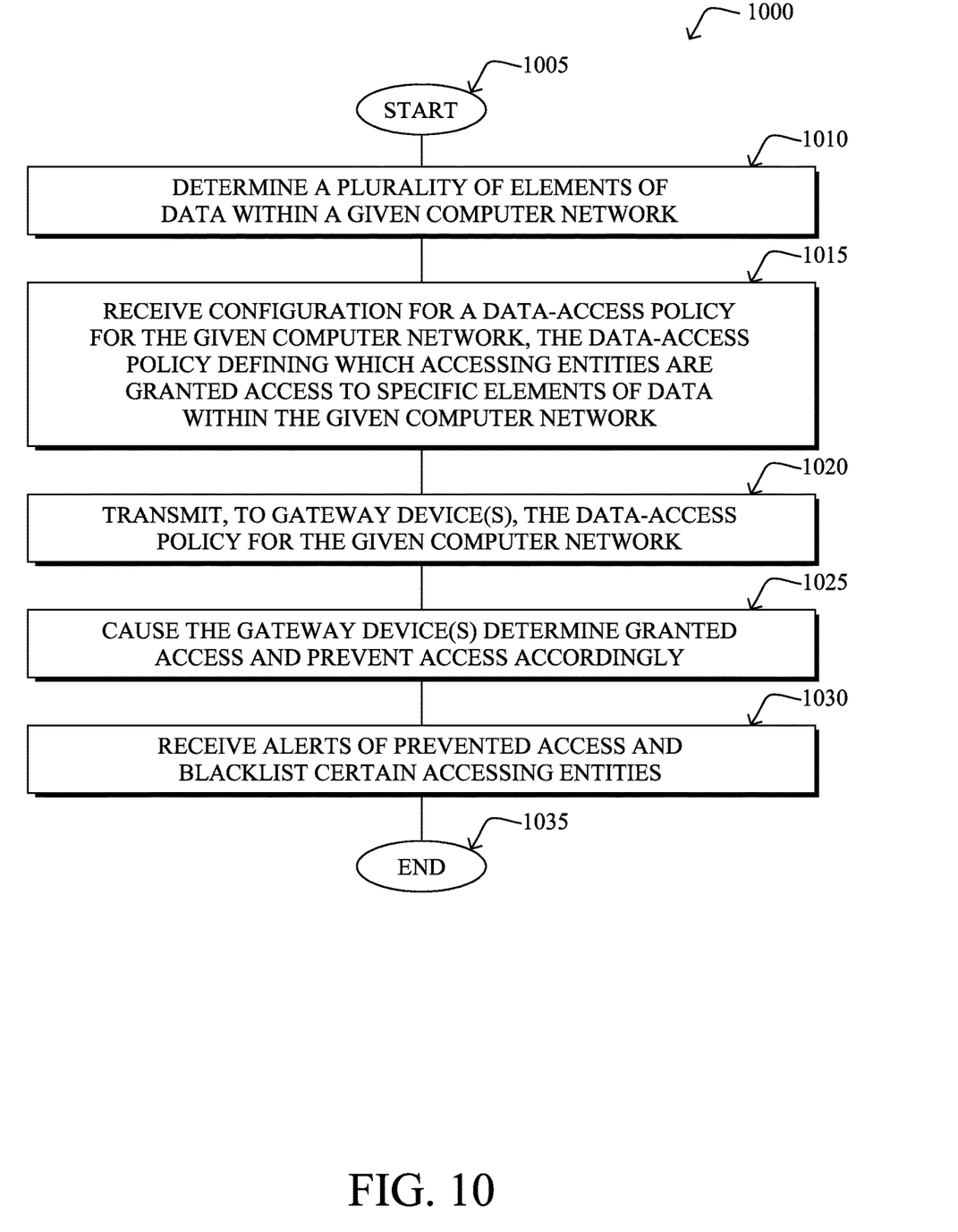
FIG. 10 illustrates another example simplified procedure for broker-coordinated selective sharing of data in a network, particularly from the perspective of a broker.

Further, FIG. 10 illustrates an example simplified procedure for broker-coordinated selective sharing of data in a network in accordance with one or more embodiments described herein, particularly from the perspective of the broker 310. For example, a non-generic, specifically configured device (e.g., device 200 as a broker) may perform procedure 1000 by executing stored instructions (e.g., process 248). The procedure 1000 may start at step 1005, and continues to step 1010, where, as described in greater detail above, a centralized broker device 310 determines a plurality of elements of data within a given computer network 325, such that it may receive, in step 1015, configuration for a data-access policy 400 for the given computer network, where, as noted, the data-access policy defines which of one or more accessing entities are granted access to specific elements of data within the given computer network. Note that as also described above, the data-access policy may define groups of one or more accessing entities that are granted access as a group 810 to specific elements of data within the given computer network.

In step 1020, the centralized broker device may transmit the data-access policy for the given computer network to one or more gateway devices 320/330, thus causing, in step 1025 based on the data-access policy, the gateway device(s) to determine whether a particular accessing entity has been granted access to each of the one or more particular elements of data of a request based on the data-access policy, and to prevent access for the particular accessing entity to any of the one or more particular elements of the data request to which the particular accessing entity has not been granted access, as detailed above (e.g., ingress and/or egress gateway functionality, accordingly)

In one embodiment, the broker 310 may also receive alerts in step 1030 in response to prevented access, and may blacklist a given accessing entity in response to a threshold number of alerts regarding that given accessing entity, as mentioned above.

The illustrative simplified procedure 1000 may then end in step 1035, notably with the option to receive further configuration updates and/or further alerts, and so on.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, provide for broker-coordinated selective sharing of data. In particular, according to the techniques herein, subscription to the exchange will be at the discretion of the organization looking to get data from a different organization, while the data-owner remains responsible for building the appropriate relationship and data-access view (i.e., a partner can only retrieve data that they are authorized to have). Notably, according to embodiments of the techniques herein, critical data never traverses the brokerage, thus eliminating the risk of cloud data exposure. Furthermore, relationships between data owners and data accessors (e.g., product manufacturers in industrial networks and device providers/vendors) can be maintained and updated via the centralized broker exchange, where the data owner (e.g., device owner) does not need to configure any updates to endpoint devices (e.g., each of the IoT devices).

While there have been shown and described illustrative embodiments that provide for broker-coordinated selective sharing of data, it is to be understood that various other adaptations and modifications may be made within the spirit and scope of the embodiments herein. For example, while certain embodiments are described herein with respect to "IoT" networks in particular, the techniques are not limited as such and may be used with computer networks, generally, in other embodiments. In addition, while certain Edge/Fog devices are shown, such as access points, gateways, etc., other suitable devices may be used, accordingly. That is, the embodiments have been shown and described herein with relation to specific network configurations (orientations, topologies, protocols, terminology, etc.), and particularly to "fog" computing. However, the embodiments in their broader sense are not as limited, and may, in fact, be used with other types of networks and protocols, regardless of their nomenclature.

Furthermore, though the techniques herein have been generally described in terms of access to receiving collected data, other access control may be afforded by the techniques herein, such as controlling access to actuator control from outside accessing entities (e.g., preventing actuator control of IoT devices from external entities based on the data-access policy configuration). That is, the gateway device 320 may receive, from a particular accessing entity (e.g., a gateway 330), a request for actuator control of one or more devices within the given computer network (e.g., industry 1), and may correspondingly determine, based on the data-access policy, whether the particular accessing entity has been granted access to control the one or more devices of data of the request. If not, then the gateway device may prevent control of the one or more devices of the data request to which the particular accessing entity has not been granted access to control, similarly to the techniques described above.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   identifying, by a broker, a plurality of elements of data generated by an endpoint device within a computer network;
   generating, by the broker, a data-access policy for the plurality of elements of data, the data-access policy defining which of one or more accessing entities are granted access to one or more elements of data within the plurality of elements of data;
   facilitating, by the broker, formation of a secure connection between a gateway device of the computer network and an accessing entity of the one or more accessing entities; and
   transmitting, from the broker to the gateway device, the data-access policy to the gateway device of the computer network, wherein the gateway device sends the one or more elements of data to the accessing entity via the secure connection based on a determination by the gateway device that the accessing entity has been granted access to the one or more elements of data according to the data-access policy.

2. The method of claim 1, wherein the gateway device receives the one or more elements of data from a data collector in the computer network that collects the one or more elements of data from the endpoint device.

3. The method of claim 1, wherein the broker is external to the computer network.

4. The method of claim 1, further comprising:
   validating, by the broker, an identity of the gateway device for the computer network, prior to facilitating the formation of the secure connection.

5. The method of claim 1, wherein identifying the plurality of elements of data generated by the endpoint device within the computer network comprises:
   receiving, at the broker and from the gateway device, an indication of the plurality of elements of data generated by the endpoint device within the computer network.

6. The method of claim 5, wherein the gateway identifies the plurality of elements of data from an asset discovery service that dynamically discovers the endpoint device within the computer network.

7. The method of claim 1, wherein the endpoint device is a sensor.

8. The method of claim 1, wherein the endpoint device is an actuator.

9. The method of claim 1, wherein the gateway device is a router at an edge of the computer network.

10. An apparatus, comprising:
    one or more network interfaces to communicate with one or more computer networks;
    a processor coupled to the network interfaces and configured to execute one or more processes; and
    a memory configured to store a process executable by the processor, the process, when executed, configured to:
       identify a plurality of elements of data generated by an endpoint device within a computer network;
       generate a data-access policy for the plurality of elements of data, the data-access policy defining which of one or more accessing entities are granted access to one or more elements of data within the plurality of elements of data;

facilitate formation of a secure connection between a gateway device of the computer network and an accessing entity of the one or more accessing entities; and transmit, to the gateway device, the data-access policy to the gateway device of the computer network, wherein the gateway device sends the one or more elements of data to the accessing entity via the secure connection based on a determination by the gateway device that the accessing entity has been granted access to the one or more elements of data according to the data-access policy.

11. The apparatus as in claim 10, wherein the gateway device receives the one or more elements of data from a data collector in the computer network that collects the one or more elements of data from the endpoint device.

12. The apparatus as in claim 10, wherein the apparatus is external to the computer network.

13. The apparatus as in claim 10, wherein the process, when executed, is further configured to:
validate an identity of the gateway device for the computer network, prior to facilitating the formation of the secure connection.

14. The apparatus as in claim 10, wherein to identify the plurality of elements of data generated by the endpoint device within the computer network comprises:
receiving, from the gateway device, an indication of the plurality of elements of data generated by the endpoint device within the computer network.

15. The apparatus as in claim 14, wherein the gateway identifies the plurality of elements of data from an asset discovery service that dynamically discovers the endpoint device within the computer network.

16. The apparatus as in claim 10, wherein the endpoint device is a sensor.

17. The apparatus as in claim 10, wherein the endpoint device is an actuator.

18. The apparatus as in claim 10, wherein the gateway device is a router at an edge of the computer network.

19. A tangible, non-transitory, computer-readable medium having computer-executable instructions stored thereon that, when executed by a processor on a broker, cause the broker to perform a method, comprising:
identifying, by the broker, a plurality of elements of data generated by an endpoint device within a computer network;

generating a data-access policy for the plurality of elements of data, the data-access policy defining which of one or more accessing entities are granted access to one or more elements of data within the plurality of elements of data;

facilitating formation of a secure connection between a gateway device of the computer network and an accessing entity of the one or more accessing entities; and transmitting, to the gateway device, the data-access policy to the gateway device of the computer network, wherein the gateway device sends the one or more elements of data to the accessing entity via the secure connection based on a determination by the gateway device that the accessing entity has been granted access to the one or more elements of data according to the data-access policy.

20. The tangible, non-transitory, computer-readable medium of claim 19, the method further comprising:
receiving, from the gateway device, an indication of the plurality of elements of data generated by the endpoint device within the computer network.

* * * * *